(12) United States Patent
Ootsuka

(10) Patent No.: US 6,659,540 B1
(45) Date of Patent: Dec. 9, 2003

(54) VEHICLE REAR BODY STRUCTURE

(75) Inventor: Tomonori Ootsuka, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/324,295

(22) Filed: Dec. 20, 2002

(30) Foreign Application Priority Data

Dec. 20, 2001 (JP) ........................................ 2001-386856

(51) Int. Cl.$^7$ .................................................. B60J 7/00
(52) U.S. Cl. ....................... 296/188; 296/203.03; 296/3; 296/187.02; 414/563
(58) Field of Search ........................... 296/188, 203.04, 296/214, 3, 203.03, 287.11, 10, 187.05, 187.02, 103, 187.09, 187.13; 414/563, 546, 532; 180/68.2

(56) References Cited

U.S. PATENT DOCUMENTS

| 4,269,396 | A | * | 5/1981 | Easterwood | 414/563 |
|---|---|---|---|---|---|
| 4,338,059 | A | * | 7/1982 | Anderson | 414/546 |
| 4,634,173 | A | * | 1/1987 | Aonuma et al. | 296/203.04 |
| 4,852,938 | A | * | 8/1989 | Hirshberg et al. | 296/214 |
| 4,854,628 | A | * | 8/1989 | Halberg | 296/3 |
| 4,934,895 | A | * | 6/1990 | Thibodeaux | 414/532 |
| 5,085,484 | A | * | 2/1992 | Mori | 296/203.03 |
| 5,108,141 | A | * | 4/1992 | Anderson | 296/3 |
| 5,228,741 | A | * | 7/1993 | Ide | 296/203.04 |
| 5,267,772 | A | * | 12/1993 | Ohta et al. | 296/187.11 |
| 5,492,259 | A | * | 2/1996 | Tippets | 296/10 |
| 5,561,359 | A | * | 10/1996 | Matsuura et al. | 180/68.2 |
| 5,779,271 | A | * | 7/1998 | Dorow et al. | 296/187.05 |
| 6,296,301 | B1 | * | 10/2001 | Schroeder et al. | 296/187.02 |
| 6,309,007 | B1 | * | 10/2001 | Essig et al. | 296/103 |
| 6,367,869 | B1 | * | 4/2002 | Baccouche et al. | 296/187.09 |
| 6,378,933 | B1 | * | 4/2002 | Schoen et al. | 296/203.03 |
| 6,419,304 | B1 | * | 7/2002 | Richardson et al. | 296/187.13 |

FOREIGN PATENT DOCUMENTS

| JP | 59 32522 | * | 2/1984 |
|---|---|---|---|
| JP | 60 131377 | * | 7/1985 |
| JP | 1 156181 | * | 6/1989 |
| JP | 2 258480 | * | 10/1990 |
| JP | 5 16837 | * | 1/1993 |
| JP | 05-278643 | | 10/1993 |
| JP | 9 71266 | * | 3/1997 |
| JP | 11 180347 | * | 7/1999 |

* cited by examiner

Primary Examiner—Kiran Patel
(74) Attorney, Agent, or Firm—Smith, Gambrell & Russell LLP

(57) ABSTRACT

A rear body structure of a vehicle has a pair of first reinforcement members, second reinforcement members and third reinforcement members. The first members are provided from both edges of the roof to a front section of the pickup bed. Each first member is provided so that its front section lies along one of the edges of the roof while its rear section lies along one of the first pillars. The second members are provided on upper edges of side panels provided at both sides of the pickup bed from the front to rear ends of the pickup bed. Each second member is jointed, at the front end to one of the first members. Each second member is segmented into a first crushable zone and a second zone. The first zone is located behind the second zone and more fragile than the second zone against the load applied from behind the vehicle. Each third member is provided from a lower edge of one of the side panels at the corresponding rear end of the pickup bed to a rear end of the second zone in the vicinity of a front end of the first zone so as to effectively absorb the collision energy.

4 Claims, 2 Drawing Sheets

VEHICLE REAR BODY STRUCTURE

BACKGROUND OF THE INVENTION

1. Field of the Invention

The present invention relates to a rear body structure of a vehicle having a pickup bed at the rear section, particularly for absorbing a collision impact from behind the vehicle.

2. Description of Prior Art

A rear body structure of a vehicle having a pickup bed at a rear section, convenient for cargo delivery, is disclosed in Japanese Un-examined Patent Publication No. 5-278643.

The pickup bed has an upwardly open space, and hence being an adverse structure in view of vehicle body strength. It is usually provided with a tailgate at the rearmost section for smooth cargo loading and unloading.

The pickup bed and its surrounding structure should bear a considerably heavy load such as a heavy cargo or an operator applied on the tailgate and also the pickup-bed rear section.

Such a vehicle requires countermeasures against a collision at the rear section to minimize deformation of the cabin for offering a driver with an enough space to survive when crushed and further to minimize deformation of door frames for rescue.

To meet such requirements, the pickup bed has to function as a crushable zone for absorbing collision impact.

Some vehicles have a monocoque body with a pickup bed, such as, disclosed in Japanese un-examined Patent Publication No. 5-27843. Also developed is a sedan-type vehicle having a monocoque body with a pickup bed at the rear section.

These types of the vehicle, however, require further improvements in vehicle body strength, particularly, in view of the collision from behind.

SUMMARY OF THE INVENTION

In view of the foregoing disadvantages, a purpose of the present invention is to provide a rear body structure of a vehicle having a pickup bed at the rear section with high vehicle body strength and high impact absorbing capability against the collision from behind.

The present invention provides a rear body structure of a vehicle having: a cabin; a pickup bed provided behind the cabin; a roof covering an upper section of the cabin; a pair of pillars provided at both rear ends of the cabin; a pair of side panels provided at both sides of the pickup bed from front ends of the pickup bed to the rear ends thereof, the rear body structure including: a pair of first reinforcement members provided from both edges of the roof to a front section of the pickup bed so that a front section of each first member lies along one of the edges of the roof while a rear section of each first member lies along one of the first pillars; a pair of second reinforcement members provided on upper edges of the side panels, each second reinforcement member being jointed, at a front end, to one of the first reinforcement members, each second reinforcement member being segmented into a first crushable zone and a second zone, the first crushable zone being located behind the second zone and being more fragile than the second zone against load applied from behind the vehicle; and a pair of third reinforcement members each provided from a lower edge of one of the side panels at the corresponding rear end of the pickup bed to a rear end of the second zone, in the vicinity of a front end of the first crushable zone.

DETAILED DESCRIPTION OF PREFERRED EMBODIMENTS

A preferred embodiment according to the present invention will be disclosed with reference to the attached drawings.

Figure 1:
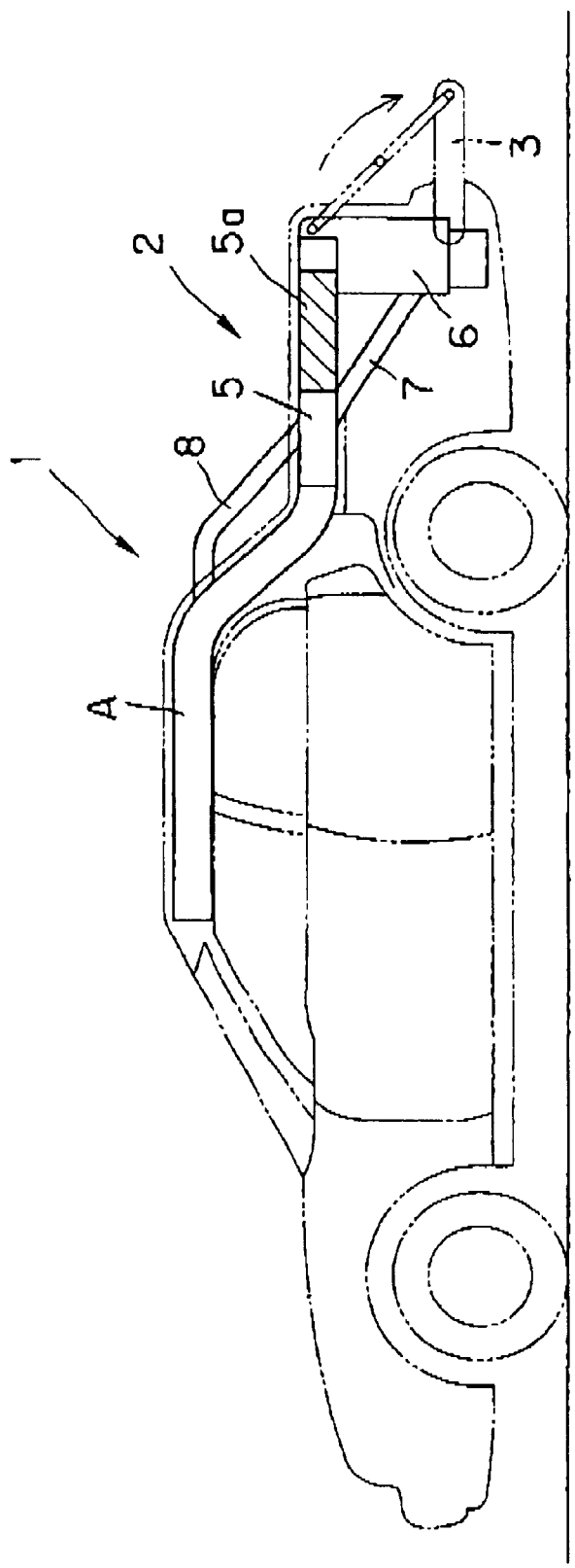
FIG. 1 is a left side view of a vehicle, illustrating an embodiment of a vehicle body structure according to the present invention.

FIG. 1 shows a vehicle 1 having a rear body structure of the embodiment according to the present invention, in which dashed lines indicate a vehicle outline while solid lines indicate major parts of the rear body structure.

As shown, the vehicle 1 is equipped with a cabin having front and rear sheets with four doors. The vehicle 1 is a sedan- or station-wagon-based vehicle having a monocoque body equipped with a pickup bed 2 at the rear section.

The right and left sides of the vehicle 1 have a symmetrical structure, although the left side only shown in FIG. 1. Hence, the left side structure will only be explained below for brevity.

The vehicle 1 is equipped with a tailgate 3 at the rearmost section, which is opened downwardly when loading and unloading cargos to and from an upward open space of the pickup bed 2.

Provided along a C-pillar (rearmost pillar) from the side edge of a vehicle roof is a first reinforcement member 4. In detail, the front section of the member 4 lies along the side edge of the roof while the rear section of the member 4 bends downwardly along the C-pillar. The rear end of the member 4 reaches almost the front section of the pickup bed 2. The first member 4, particularly, its rear section provided along the C-pillar, also functions as a vehicle side-section reinforcement member.

A second reinforcement member S is provided along the upper edge of a side panel of the pickup bed 2. The front end of the second member 5 is jointed to the rear end of the first reinforcement member 4. The rear end of the second member 5 is jointed to the upper end of a pillar 6 provided as perpendicular to the side-panel rearmost section of the pickup bed 2.

Figure 2:
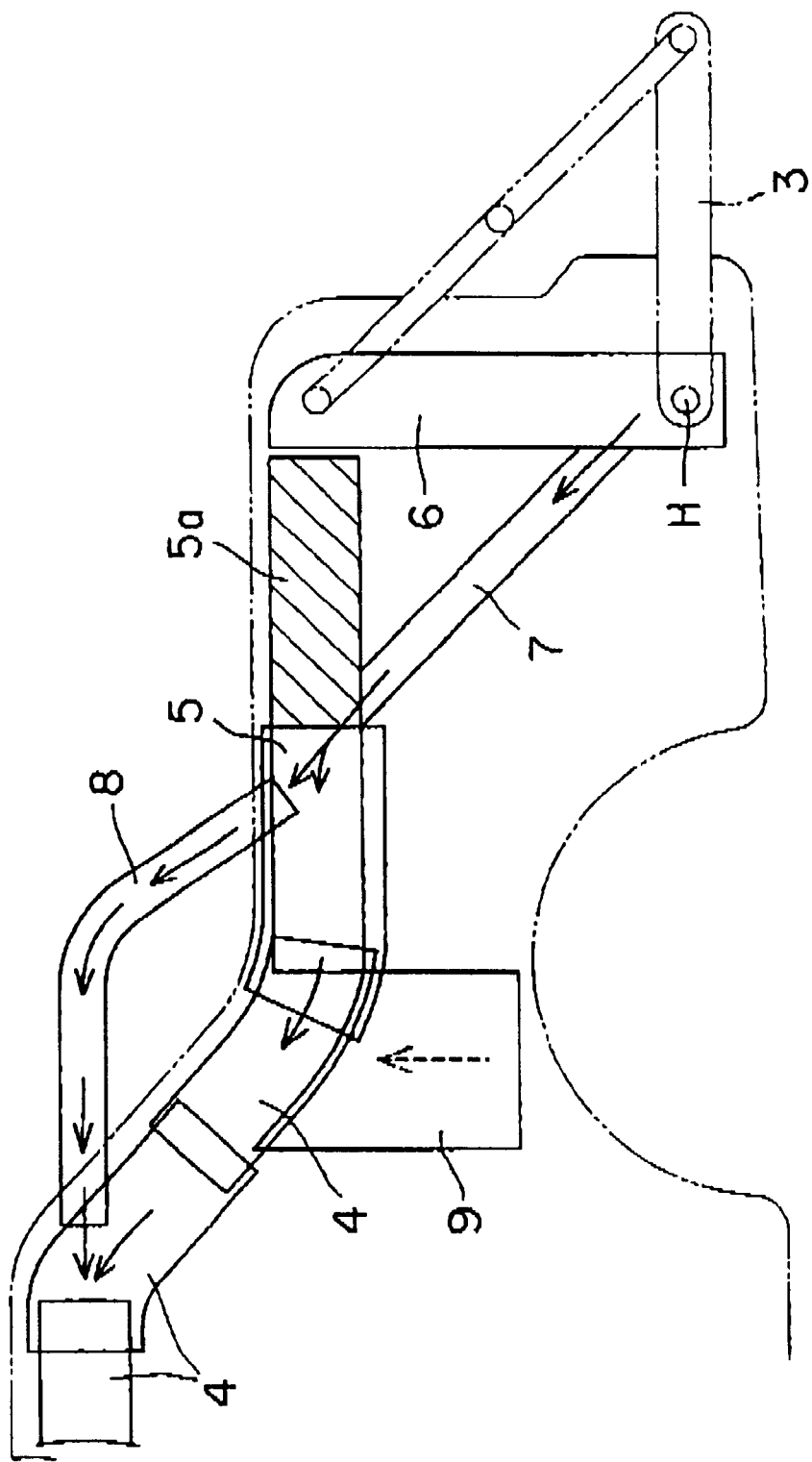
FIG. 2 is an enlarged left side view indicating a rear section of the vehicle body structure shown in FIG. 1.

The pillar 6 is located at one edge of the tailgate 3 to reinforce the vehicle body structure. A hinge H of the tailgate 2 is located at the lower end of the pillar 6, as shown in FIG. 2.

A third reinforcement member 7 is provided obliquely from the lower end of the pillar 6 (in the vicinity of the hinge H of the tailgate 3) to almost the middle section of the second reinforcement member 5. One end of the third member 7 is jointed to the lower end of the pillar 6. The other end of the third member 7 is jointed to the second member 5 almost at the middle section thereof. A pipe 8 is jointed, at the rear end, to the second member 5 in the vicinity of the middle section of the member 5. The pipe 8 is provided on the elongated line of the third member 5. The front end of the pipe 8 is jointed to a root rear edge located at the middle section of the first reinforcement member 4.

The pipe 8 in this embodiment extends from its front end in a direction almost horizontal to the vehicle length direction and bends toward its rear end. Not only that, the pipe 8 may be of a straight type from the front to the rear ends.

The pipe 8 is used for fixing cargos loaded on the pickup bed 2, function as a handle for an operator and also function as a reinforcement member for enhanced rigidity or strength of the vehicle 1.

The first, the second and the third reinforcement members 4, 5 and 7 may be of a one-frame member or a batch of members jointed to the monocoque body. Or, each reinforcement member may be composed of several parts jointed to one another.

The third reinforcement member 7 in this embodiment is a bead produced when rear parts of the side panel of the pickup bed 2 are press-molded. In other words, the third member 7 can be produced using the side-panel parts only, with no increase in cost and load which may otherwise occur if additional parts are required. Moreover, the third member 7 can be produced with a usual press-molding with no additional assembly steps required.

As indicated by hatching lines in FIG. 1, a crushable zone 5a is provided at the rear section of the second reinforcement member 5, which is located behind the point at which the second member 5 and the third reinforcement member 7 are jointed to one another.

It is a well known technique in a vehicle safety measure against collision to have such a crushable zone with strength lower than the surrounding parts. The crushable zone provided with low strength is deformed, when load is applied due to collision, to absorb energy created by the collision. The crushable zone 5a can be provided in a specific manner so that it will be deformed due to the load applied only in a specific direction.

The crushable zone 5a in this embodiment is provided so that it will be deformed due to the load applied only from behind the vehicle 1. In detail, the second reinforcement member 5 is a cylindrical type member having opposite open ends, provided with the zone 5a having a press-molded section (or apertures) which will be deformed first. The second member 5 may be composed of different materials over the zone 5a and the remaining zone. Or, the second member 5 may have filler therein except the zone 5a.

As disclosed above, the reinforcement members 4, 5 and 7 arranged on both sides of the pickup bed 2 in this embodiment give high strength and rigidity to the bed 2 and the surroundings, thus offering the vehicle 1 high strength and rigidity.

Indicated by arrows in FIG. 2 is the direction of load which will be applied to the rear body structure of the vehicle 1 having the reinforcement members 4, 5 and 7 each assembled with several parts jointed to one another.

Load will be applied to the vehicle 1 in a downward direction when a heavy cargo is loaded or an operator gets on the rearmost section of the opened tailgate 3 or the pickup bed 2.

The vehicle 1 is implemented countermeasurements against such load to avoid the deformation, according to the present invention.

In detail, the pillar 6, the third reinforcement member 7, the front section of the second reinforcement member 5, the first reinforcement member 4 and the pipe 8 bear the load when applied on the opened tailgate 3, thus protecting the vehicle 1 from the deformation or the damage.

Particularly, when the load is applied on the tailgate 3, the second reinforcement member 5 bears the load not at the low-strengthened section (crushable zone 5a) but at the high-strengthened section, with the help of the obliquely provided third reinforcement member 7. The third member 7 does, however, not bear the load by itself and further not obstruct the other members to do it when the load is applied from behind the vehicle 1, as discussed below.

The load is applied to the vehicle 1 in an almost horizontal direction from behind when another vehicle traveling behind collides with the vehicle 1. Such load is applied to the crushable zone 5a of the second reinforcement member 5 through the pillar 6. The zone 5a is deformed to absorb the energy caused by the collision, to protect the front section from the deformation.

The crushable zone 5a could, however, not completely absorb such an energy by itself if it is too large. Such a large energy is transmitted to the roof of the vehicle 1 through the front section of the second reinforcement member 5, the first reinforcement member 4 and the pipe 8, as indicated by arrows in FIG. 2.

The rear body structure according to the present invention thus effectively protects the cabin and the doors from the deformation.

As already disclosed, the third reinforcement member 7 is jointed to the second reinforcement member 5 at the front end of the third member 7, which is almost at the same position at which the rear end of the pipe 8 is jointed to the second member 5. The arrangements allow the load caused by the collision with a vehicle traveling behind, etc., to be dispersed to the first reinforcement member 4 and the pipe 8.

The crushable zone 5a will not work against the load applied on tailgate 3 but work effectively against the collision from behind. This is because the crushable zone 5a of the second reinforcement member 5 is provided behind the front end of the third reinforcement member 7, at which the third member 7 is jointed to the second member 5.

Furthermore, in this embodiment, a rear suspension attachment 9 is jointed to the middle section of the first reinforcement member 4. This arrangement allows the load applied through a rear suspension (not shown) to be transmitted to the roof of the vehicle 1 through the attachment 9 and the first member 4, thus effectively dispersing the load.

The rear body structure according to the present intention is not limited to the embodiment disclosed above.

For example, the vehicle 1 shown in FIG. 1 has a B-pillar (center pillar). The present invention is, however, applicable to vehicles with no B-pillars. Also, for such vehicles, the first reinforcement member can be provided along the rearmost pillar (C-pillar). Moreover, a pair of the reinforcement members or the pipes 8 provided on both sides of the vehicle may be jointed to one another via a member extending in the vehicle width direction.

As disclosed above, in the rear body structure according to the present invention, the first, the second and the third reinforcement members give high strength and rigidity to the pickup bed having a large upward space and its surroundings.

Not only that, the arrangements of the pipes, the second reinforcement members (particularly, the crushable zone), the third reinforcement members, etc., as disclosed above, achieve the high strength and the rigidity against the load on the tailgate and also an effective absorption of energy and effective transmission (dispersion) of the load caused by the collision from behind.

In detail, the load applied on an opened tailgate is borne by the third reinforcement members, the front sections of the second reinforcement members, the first reinforcement members and also the pipes, thus the vehicle being protected from deformation or the damages.

Moreover, the load applied from behind almost horizontally due to the collision is applied to the crushable zone of each second reinforcement member. The crushable zone is deformed to absorb the collision energy to protect the front section of the vehicle from the deformation or the damages.

The load possessing a large collision energy applied from behind is, however, transmitted to the roof through the third reinforcement members, the front sections of the second reinforcement members, the first reinforcement members and also the pipes provided on both sides of the vehicle for fixing cargos etc., thus the cabin and the doors being protected from the deformation or the damages.

While the presently preferred embodiment of the Present invention has been shown and described, it is to be understood tat these disclosures are for the purpose of illustration and that various changes and modifications may be made without departing from the scope of the invention as set forth in the appended claims.

What is claimed is:

1. A rear body structure of a vehicle having:
   a cabin;
   a pickup bed provided behind the cabin;
   a roof covering an upper section of the cabin;
   a pair of first pillars provided at both rear ends of the cabin;
   a pair of side panels provided at both sides of the pickup bed from front ends of the pickup bed to the rear ends thereof, comprising:
      a pair of first reinforcement members provided from both edges of the roof to a front section of the pickup bed so that a front section of each first member lies along one of the edges of the roof while a rear section of each first member lies along one of the first pillars;
      a pair of second reinforcement members provided on upper edges of the side panels, each second reinforcement member being jointed, at a front end, to one of the first reinforcement members, each second reinforcement member being segmented into a first crushable zone and a second zone, the first crushable zone being located behind the second zone and being more fragile than the second zone against a load to be applied from behind the vehicle; and
      a pair of third reinforcement members each provided from a lower edge of one of the side panels at the corresponding rear end of the pickup bed to a rear end of the second zone in the vicinity of a front end of the first crushable zone.

2. The rear body structure according to claim 1, further comprising a tailgate located behind the pickup bed and a pair of second pillars erected at the rear ends of the pickup bed, the tailgate having a pair of hinges each provided at a lower end of one of the second pillars,
   wherein each third reinforcement member is provided from the lower end of one of the second pillar in the vicinity of the corresponding hinge to the rear end of the second zone.

3. The rear body structure according to claim 1 further comprising a pair of pipes each provided from a rear end of one of the edges of the roof to the rear end of the second zone in the vicinity of a point at which the second and the third reinforcement members are jointed to one another.

4. The rear body structure according to claim 1, wherein the third reinforcement member is a press-molded bead.

* * * * *